US012640073B2

(12) United States Patent
Lee et al.

(10) Patent No.: US 12,640,073 B2
(45) Date of Patent: May 26, 2026

(54) BLACK CRUSH MITIGATION SCALAR

(71) Applicant: DELL PRODUCTS L.P., Round Rock, TX (US)

(72) Inventors: BongJun Lee, Singapore (SG); Seungjae Sung, Singapore (SG); Jaehyun You, Singapore (SG)

(73) Assignee: Dell Products L.P., Round Rock, TX (US)

(*) Notice: Subject to any disclaimer, the term of this patent is extended or adjusted under 35 U.S.C. 154(b) by 13 days.

(21) Appl. No.: 18/806,453

(22) Filed: Aug. 15, 2024

(65) Prior Publication Data

US 2026/0051277 A1 Feb. 19, 2026

(51) Int. Cl.
*G09G 3/20* (2006.01)

(52) U.S. Cl.
CPC ... *G09G 3/2007* (2013.01); *G09G 2320/0233* (2013.01); *G09G 2320/0673* (2013.01); *G09G 2360/144* (2013.01)

(58) Field of Classification Search
None
See application file for complete search history.

(56) References Cited

U.S. PATENT DOCUMENTS 10,096,299 B2 10/2018 Xiong
10,431,186 B2* 10/2019 Park .................... G09G 3/3406
11,107,440 B2 8/2021 Aurongzeb et al.
2011/0074803 A1* 3/2011 Kerofsky ............ G09G 3/3406 345/589
2012/0081279 A1* 4/2012 Greenebaum ............ G09G 5/02 345/207
2014/0285477 A1* 9/2014 Cho ........................ G09G 5/02 345/207
2015/0116344 A1* 4/2015 Won ........................ G09G 5/14 345/589
2017/0061903 A1* 3/2017 Yata ..................... G09G 3/3607
2019/0259342 A1* 8/2019 Tada ........................ G09G 3/36
2020/0105226 A1* 4/2020 Greenebaum ............ G09G 5/10
2022/0208061 A1* 6/2022 Xiao .................... G09G 3/3611
2023/0015959 A1* 1/2023 Yoshida ............ G02F 1/133514
2023/0073431 A1* 3/2023 Peng .................... G09G 3/3258

* cited by examiner

*Primary Examiner* — Kenneth Bukowski
(74) *Attorney, Agent, or Firm* — Larson Newman, LLP

(57) ABSTRACT

A scalar of a display device of an information handling system includes a scalar processor and zero-gray luminance enhancer. The scalar processor generates image data by processing raw image data, including grayscale levels, received from the information handling system. The image data is used by the display device to control pixels of a display screen of the display device in rendering images on the display screen. The zero-gray luminance enhancer generates zero-gray enhancement values, each zero-gray enhancement value uniquely corresponding to one of the grayscale levels. The zero-gray enhancement values control luminance associated with the pixels.

20 Claims, 6 Drawing Sheets

Gamma curves
Red - Darkroom Contrast Ratio 1000:1
Grey - Darkroom Contrast Ratio 2000:1
Yellow – Darkroom Contrast Ratio 3000:1

Red - Screen Emitted Luminance (Darkroom)
Grey - Screen Emitted Luminance (Darkroom) + Reflected Luminance
Blue - Generated Gamma Curve with Zero-Gray Enhancement

BLACK CRUSH MITIGATION SCALAR

FIELD OF THE DISCLOSURE

The present disclosure generally relates to information handling systems, and more particularly relates to images rendered by a display device of an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A scalar of a display device for an information handling system includes a scalar processor and zero-gray luminance enhancer. The scalar processor may generate image data by processing raw image data, including grayscale levels, received from the information handling system. The image data may be used by the display device to control pixels of a display screen of the display device in rendering images on the display screen. The zero-gray luminance enhancer may generate zero-gray enhancement values, each zero-gray enhancement value uniquely corresponding to one of the grayscale levels. The zero-gray enhancement values control luminance associated with the pixels.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
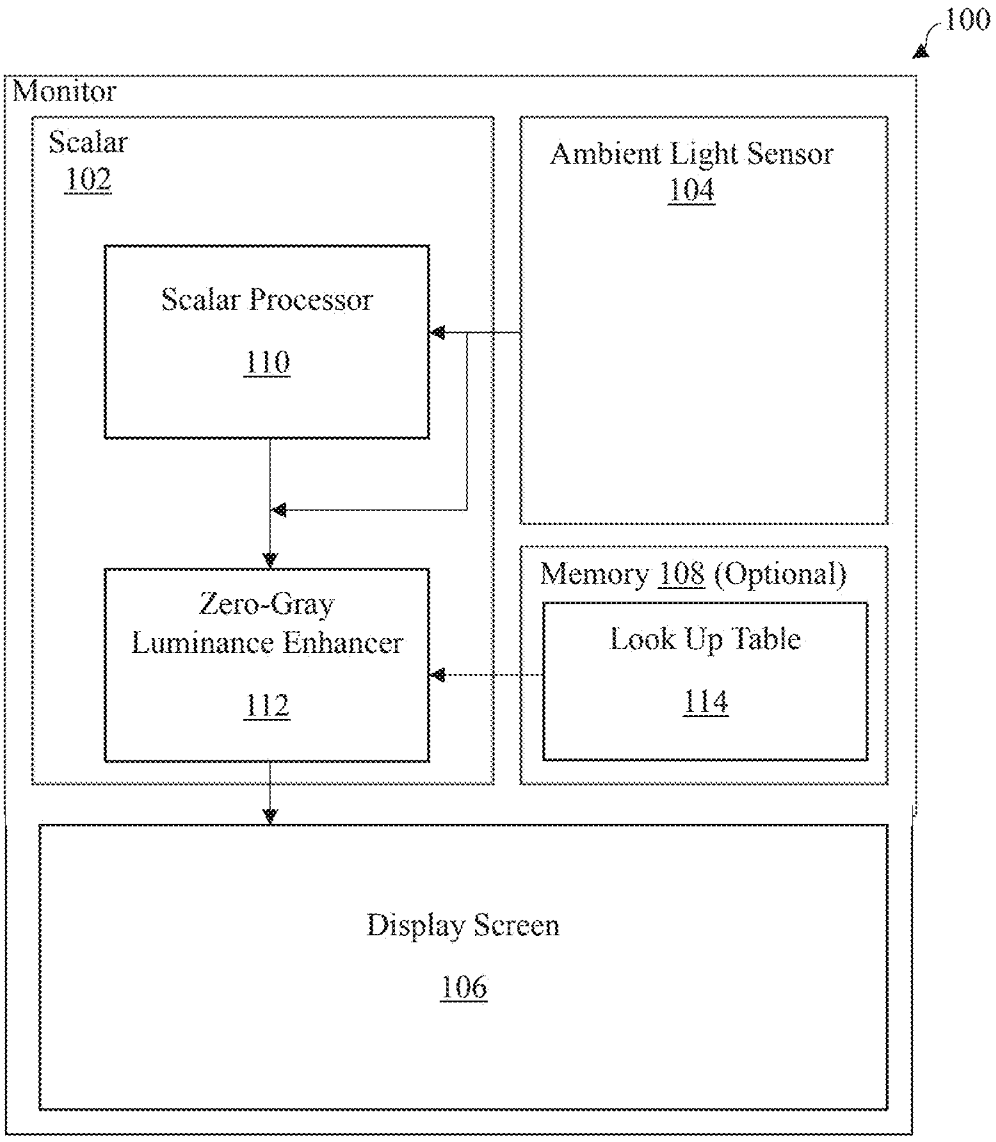
FIG. 1 is a block diagram of a monitor for an information handling system, the monitor including a zero-gray compensation scalar according to at least one embodiment of the present disclosure.

FIG. 1 illustrates a display device 100 for an information handling system according to at least one embodiment of the present disclosure. Display device 100 illustratively includes scaler 102, ambient light sensor 104, and display screen 106, such as a liquid crystal display (LCD), organic LCD panel, or the like. Optionally, display device 100 may include memory 108, which in certain arrangements may be non-volatile memory such as an electrically erasable programmable read-only memory (EEPROM). Though not explicitly shown, display device 100 may also include a timing controller that adjusts pixel values of display screen 106 to a serial high-speed interface-compatible format. Scalar 102 handles aspects such as scaling, resolution, and other refinements of images rendered visually on display screen 106 in response to raw image data received from the information handling system. Display device 100, in certain embodiments of the present disclosure, is an internal monitor, such as an integrated device of a laptop computer, desktop computer, or other all-in-one information handling system. In other embodiments, however, display device 100 may be external to an information handling system and may operatively connect to the information handling system via ports such as the High-Definition Multimedia Interface (HDMI), Digital Visual Interface (DVI), DisplayPort, or other type of interface with the information handling system.

For purposes of the present disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

A challenge to rendering high fidelity images on a display screen of a display device is the screen's reflection of ambient light; that is, the reflection of light from one or more sources of the surrounding environment in which the display device is operating. Ambient light can adversely affect shading and/or color contrasts within the image by reducing the range of luminance (typically measured as candelas per square meter, $cd/m^2$, or nits) between dark and bright regions of the image displayed on the screen. If the luminance reflected from the screen is higher than the luminance of low grayscale regions (i.e., relatively darker ones) of images rendered on the screen, then a viewer is likely to find it difficult to visually distinguish between grays and colors of the image. The loss of image fidelity, especially in dark (i.e., low-gray) regions of an image, is termed "black crush." One aspect of the embodiments of the present disclosure is the mitigation of black crush with respect to images that are rendered by an information handling system display device that includes features described in the present disclosure.

Referring still to FIG. 1, scalar 102 of display device 100 includes scalar processor 110 and zero-gray luminance enhancer 112. Scalar processor 110 generates image data by processing raw image data, including grayscale levels, that are received from an information handling system as well as ambient luminance data that is received from ambient light sensor 104. The processing is performed by scalar processor 110 to improve the quality of the image rendered by display device 100 on display screen 106 and may include image contrast adjustments of color coordinates and brightness, image resolution upscaling, gamma correction, and the like. The adjustments may be based, at least in part, on color coordinates and ambient luminance data generated by ambient light sensor 104 in response to the light of one or more light sources impinging on display screen 106. Image data generated by scalar processor 110 is used by display device 100 to control pixels of display screen 106 in rendering images on the display screen.

Display screen 106 may include color image pixels and, corresponding to each pixel, a grayscale level (e.g., index or number) indicating luminance intensity information. The grayscale levels are used by display device 100 in controlling the luminance or brightness intensity of the pixels of display screen 106. In a color image, each pixel is represented by three color channels (RGB), and the grayscale levels can be derived from the information in various ways, including for example using a weighted average of the color channels. Accordingly, the data generated by scalar processor 110 and ambient light sensor 104 may include a grayscale level corresponding to each pixel of display screen 106. The grayscale levels may be measured by a predetermined number of grayscale levels (e.g., $2^{10}=1024$ or $2^8=256$), the darkest level (i.e., black) having a grayscale level of zero.

Figure 2:
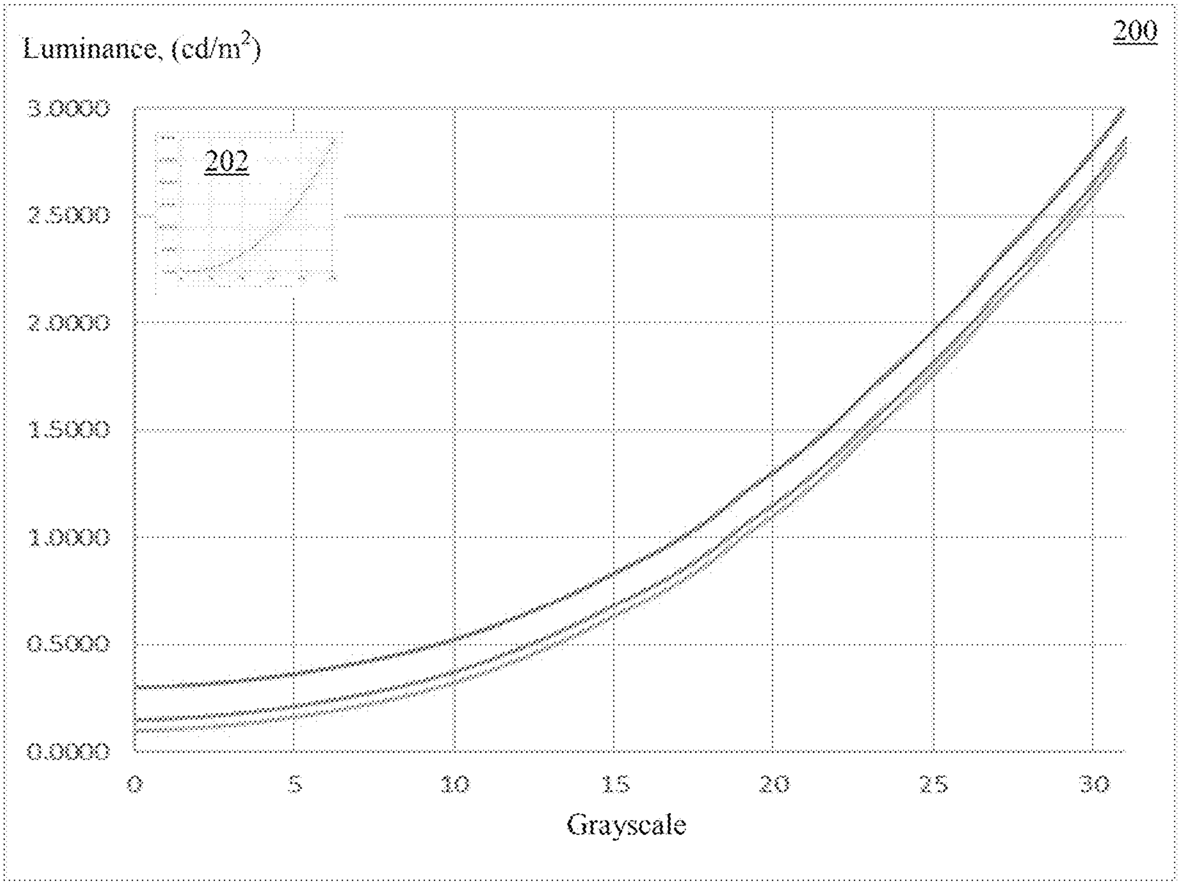
FIG. 2 is a graph of representative gamma curves in accordance with at least one embodiment of the present disclosure.

Referring additionally to FIG. 2, luminance generally is a non-linear function with respect to a grayscale, as illustrated by the representative gamma curves of graph 200. Graph 200 is a scaled version of graphical inset 202, which depicts gamma curves for screens corresponding, respectively, to three different darkroom CR ratios. As shown in graph 200, as the % Delta, or approximate slope, of each gamma curve decreases the lower is the grayscale level. The graphs illustrate that it becomes increasingly difficult to distinguish changes in regions of an image as grayscale levels decrease; that is, as the regions become darker and the gamma curve becomes flatter. The lower luminance with respect to certain regions of an image reduces the image's fidelity. The loss of fidelity makes it difficult for a viewer to distinguish between different colors and grays and can contribute to black crush, especially if the luminance of light reflected from the display screen is higher than that emanating from the screen. The zero-gray enhancement values generated by zero-gray luminance enhancer 112 mitigate the loss fidelity and black crush.

Referring back to FIG. 1, zero-gray luminance enhancer 112, in accordance with certain embodiments, generates zero-gray enhancement values based on ambient luminance data generated by ambient light sensor 104. Each zero-gray enhancement value generated by zero-gray luminance enhancer 112 uniquely corresponds to one of the grayscale levels included among the raw image data received by display device 100 from an information handling system. The zero-gray enhancement values generated by zero-gray luminance enhancer 112 may be based on reflected luminance and an ambient contrast ratio (CR) corresponding to display screen 106, as well as the ambient luminance data generated by ambient light sensor 104. Ambient luminance ($cd/m^2$) may be determined from the data generated by ambient light sensor 104. Reflected luminance, Lr, may be generated according to the following equation:

$$Lr = E * R\ \% * \left(\frac{1}{\pi}\right), \qquad \text{EQ. (1)}$$

where E is the ambient luminance determined by ambient light sensor 104 and R % is a reflectance corresponding to display screen 106. R % may be empirically determined according to the following equation:

$$R\% = \alpha Rs(1+\cos\theta) + \beta Rh + \gamma Rl, \qquad \text{EQ. (2)}$$

where Rs is specular reflectance luminance, Rh is haze reflectance luminance, and Rl is Lambertian reflectance. The values of coefficients α, β, γ, and θ may be empirically determined based on the reflective response of display screen 106 under the conditions of the specific environment (e.g., indoor lighting of an office environment or natural light of an outdoor environment) in which display device 100 operates in rendering an image on the display screen. The values of the coefficients may change if the environment changes.

Reflected luminance, Lr, may be used to determine the ambient CR of display screen 106. Ambient CR is a measurement of the relation between the maximum and the minimum light intensity that a display screen can generate. It is measured as the ratio of the sum of the reflected luminance, Lr, and white luminance, Lw, relative to the sum of black luminance, Lk, and reflective luminance Lr:

$$\text{Ambient } CR = \frac{(Lw + Lr)}{(Lk + Lr)}, \quad \text{EQ. (3)}$$

where the numerator is white luminance under ambient light and the denominator is black luminance under ambient light.

Figure 3:
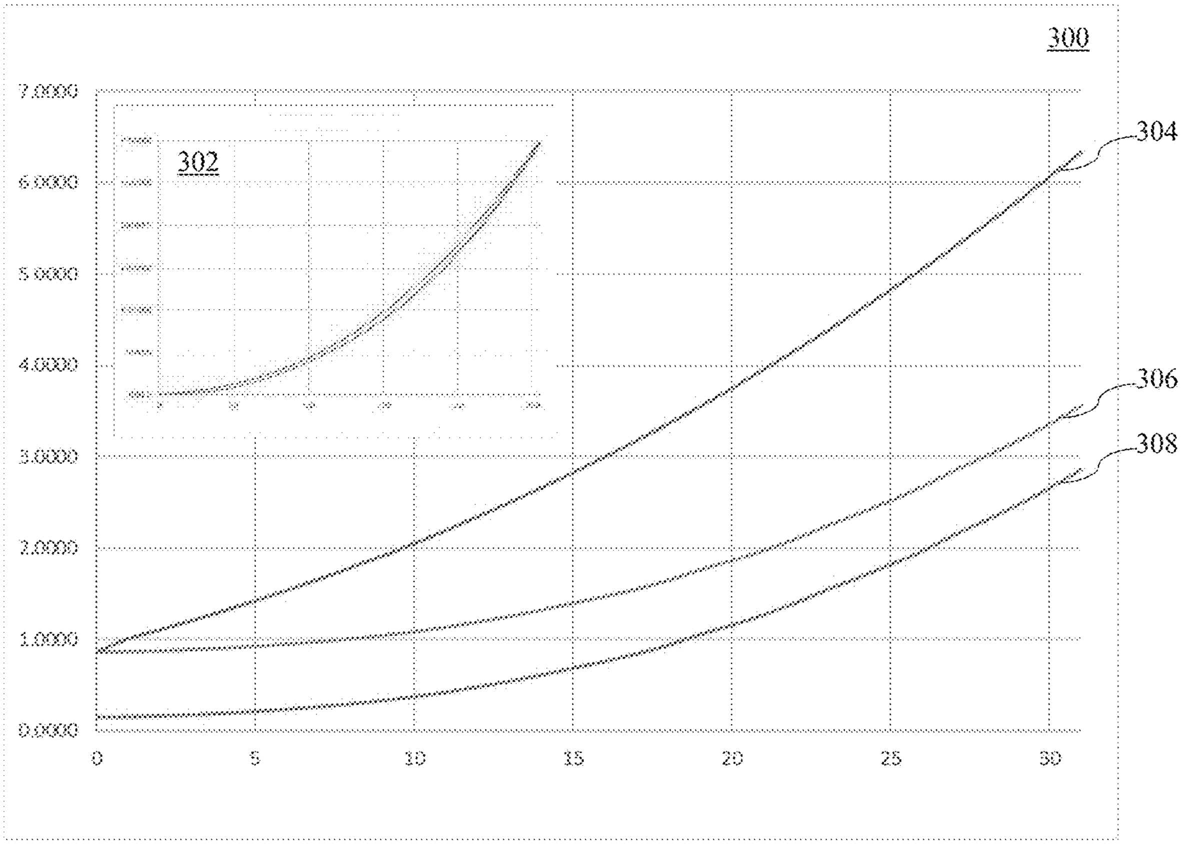
FIG. 3 is another graph of representative gamma curves, including a gamma curve generated in accordance with at least one embodiment of the present disclosure.

Zero-gray luminance enhancer 112 may use the ambient CR from EQ. (3) to determine a zero-gray luminance based on the ambient luminance determined by ambient light sensor 104. For example, if the darkroom CR yields a ratio of 3000:1 and ambient luminance, E, is 300 cd/m$^2$, then the zero-gray luminance is 0.1 cd/m$^2$. Zero-gray luminance enhancer 112 generates zero-gray enhancement values by combining zero-gray luminance with reflected luminance over a range of grayscale levels. The operation yields a sharper gradient for a resulting gamma curve, as illustrated by the example gamma curves of graph 300 in FIG. 3. Graph 300 is a scaled version of graphical inset 302. Generated gamma curve 304 is generated by zero-gray luminance enhancer 112 with zero-gray enhancement. Gamma curve 306 is display screen 106 luminance plus reflected luminance, and gamma curve 308 is display screen 106 luminance in a dark room (i.e., low or no ambient light). Illustratively, with the above-assumed ambient luminance, E, of 300 cd/m$^2$ and an assumed R % of 0.74 percent, Lr according to EQ. (1) is 0.71 cd/m$^2$. Combining that value with the above zero-gray luminance of 0.1 cd/m$^2$ yields a combined luminance of 0.81 cd/m$^2$ at a grayscale level of zero. As shown, the combination generated by zero-gray luminance enhancer 112 exhibits a sharp gradient for gamma curve 304, demonstrating that even for very low grayscale levels the zero-gray enhancement values change significantly as the grayscale levels change.

The zero-gray enhancement values generated by zero-gray luminance enhancer 112 are used by display device 100 to control the luminance associated with the pixels of display screen 106. The enhanced luminance of the zero-gray enhancement values, even ones corresponding to low grayscale levels, means that the dark regions of a display image are more pronounced than otherwise. This mitigates any black crush effect. The sharper gradient of the zero-gray enhancement values means that image contrasts are sharper, even between regions whose differences in shading are slight (i.e., regions in which the grayscale levels are close to one another). This makes it easier for a viewer to distinguish between different colors and grays.

In certain embodiments of the present disclosure, the zero-gray enhancement values can be predetermined. Accordingly, during the rendering of an image on display screen 106 by display device 100, zero-gray luminance enhancer 112 may generate each zero-gray value by identifying the specific zero-gray value that corresponds to a grayscale level of a specific image, the grayscale level being one among the raw image data received by display device 100 from the information handling system, such as information handling system 600 of FIG. 6.

Predetermined zero-gray enhancement values, in some embodiments, can be electronically stored in memory 108 (e.g., an EEPROM). In some embodiments, memory 108 stores look-up table (LUT) 114, whose entries include a predetermined zero-gray enhancement value corresponding to each grayscale level listed in the table. Thus, zero-gray luminance enhancer 112 may generate zero-gray enhancement values in real-time during display device 100's rendering of an image on display screen 106 by choosing a zero-gray enhancement value from LUT 114 for each grayscale level included among the raw image data. In other embodiments, the zero-gray enhancement values corresponding to grayscale levels may be represented as gamma curves, such as those illustrated in FIGS. 2 and 3. Zero-gray luminance enhancer 112 may generate the zero-gray enhancement values for corresponding grayscale levels by identifying points on the gamma curve indicating a zero-gray enhancement value for a specific grayscale level.

Given that the zero-gray enhanced values generated by zero-gray luminance enhancer 102 depend on the ambient luminance impinging on display screen 106, it follows that if the ambient luminance changes, the zero-gray enhancement values change in response. Therefore, the same image is rendered differently (i.e., with different pixel intensities) on display screen 106 if the zero-gray enhancement values change in response to a change in ambient luminance detected by ambient light sensor 104. Accordingly, the zero-gray enhancement values generated by zero-gray luminance enhancer 112 may be a function of the specific environment in which display device 100 is operative, independent of the images rendered on display screen 106. For example, the zero-gray enhancement values generated by zero-gray luminance enhancer 112 when display device 100 operates in a typical office environment are likely different from the zero-gray values generated when the display device operates in a darkroom or in sunlight outdoors.

Likewise, the zero-gray enhancement values depend on the ambient CR of display screen 106. The zero-gray enhancement values generated by zero-gray luminance enhancer 112 change, even for rendering the same image, if the display screen of display device 100 is changed from display screen 106 to a different display screen having a different corresponding ambient CR. If the zero-gray enhancement values are predetermined and electronically stored in an LUT, then multiple LUT tables may be electronically stored—each corresponding to a different ambient CR. Similarly, if predetermined zero-gray enhancement values are represented by a gamma curve, then different gamma curves corresponding to different ambient CRs may be stored.

In different embodiments of the present disclosure, zero-gray luminance enhancer 112 may be implemented in software, hardware, or a combination of software and hardware.

Figure 4:
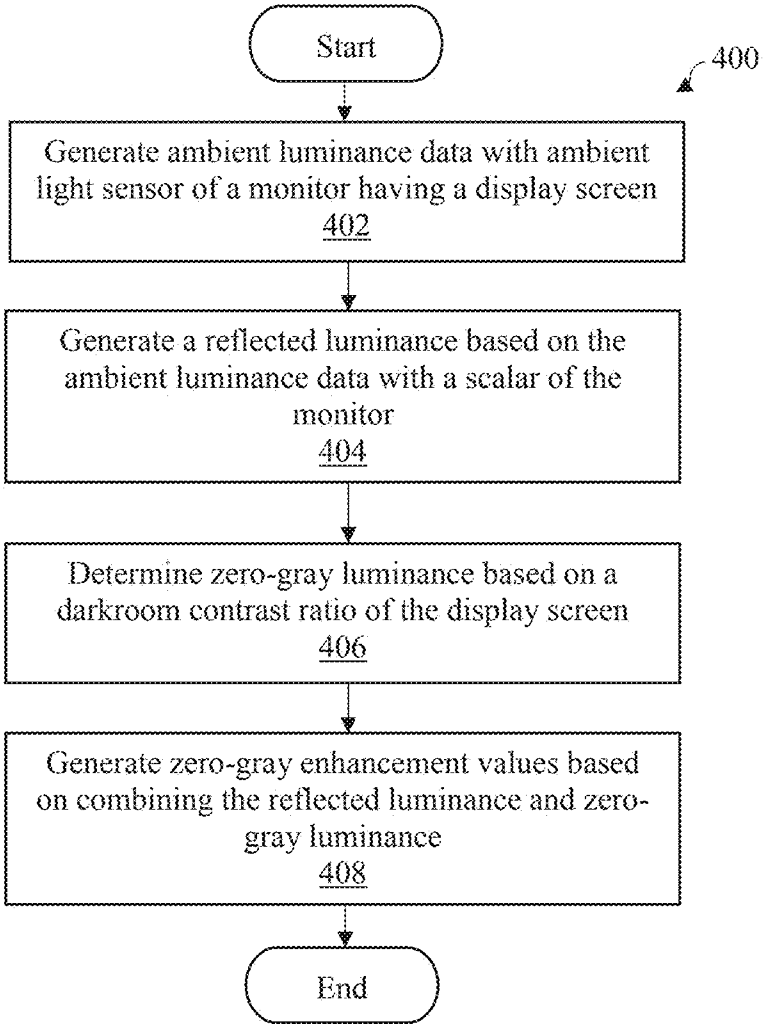
FIG. 4 is a flow diagram of a method of generating zero-gray enhancement values for controlling the luminance of pixels of a display screen of a monitor according to at least one embodiment of the present disclosure.

FIG. 4 is a flow diagram of a method 400 generating zero-gray enhancement values for controlling the luminance of pixels of a display screen according to at least one embodiment of the present disclosure, starting at step 402. It will be readily appreciated that certain steps of the method may be combined, performed simultaneously, in a different order, or perhaps omitted, without varying from the scope of the disclosure. Method 400, in certain embodiments, may be performed by a display device such as display device 100 described in the context of FIG. 1.

At step 402, ambient luminance data is generated. The ambient luminance data may be generated by an ambient light sensor such as ambient light sensor 104 of display device 100 having display screen 106. At step 404, a reflected luminance is generated based on the ambient luminance data. The reflected luminance may be generated by a scalar such as scalar 102 of display device 100 in FIG. 1. Based on a darkroom CR of the display screen, a zero-gray luminance is determined at step 406. The determination may be made by a scalar such as scalar 102. At step 408, the reflected luminance and zero-gray luminance are combined to generate zero-gray enhancement values. The generation of the zero-gray enhancement values may be performed by a scalar such as scalar 102.

Figure 5:
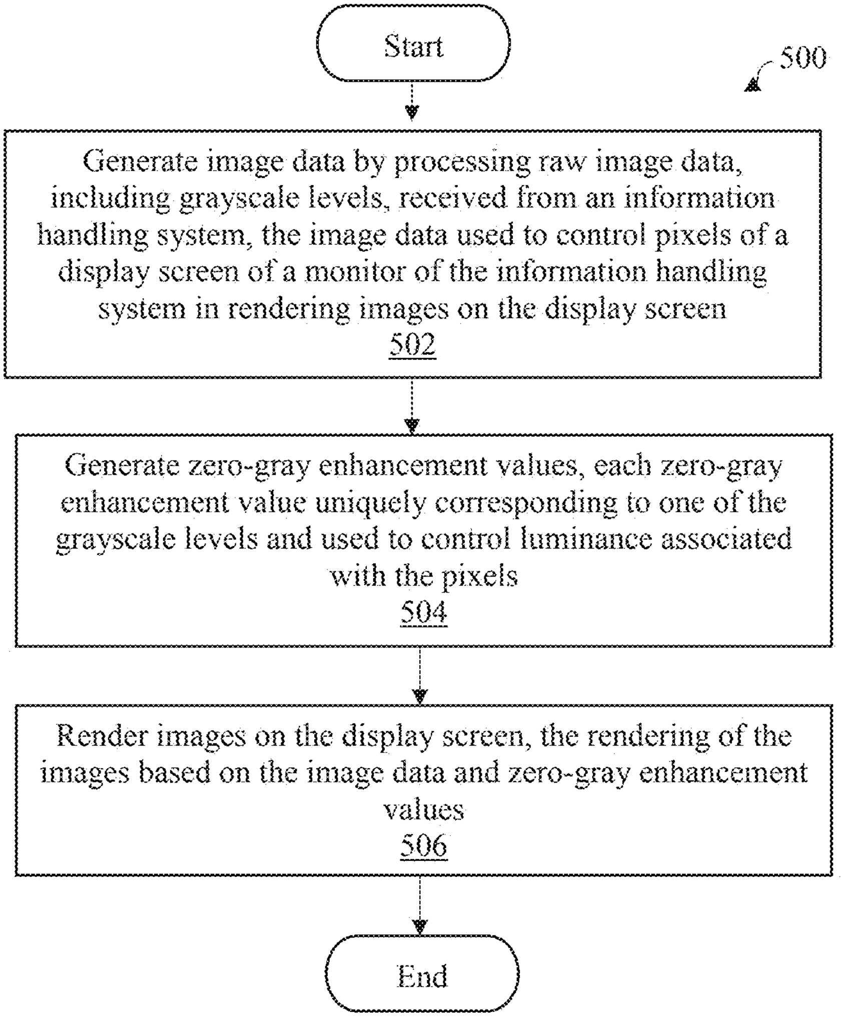
FIG. 5 is a flow diagram of a method of rendering zero-gray enhanced images on a display screen of a monitor according to at least one embodiment of the present disclosure.

FIG. 5 is a flow diagram of a method 500 of rendering zero-gray enhanced images according to at least one embodiment of the present disclosure, starting at step 502. It will be readily appreciated that not every method step set forth in this flow diagram is always necessary, and that certain steps of the methods may be combined, performed simultaneously, in a different order, or perhaps omitted, without varying from the scope of the disclosure. Method 500, in certain embodiments, may be performed with a display device of an information handling system, such as display device 100 described in the context of FIG. 1

At step 502, image data is generated by processing raw image data, including grayscale levels, received from an information handling system. The image data generated is used to control pixels of a display screen of a display device of the information handling system in rendering images on the display screen.

At step 504, zero-gray enhancement values are generated. The zero-gray enhancement values, in certain embodiments, are generated using the steps described in the context of FIG. 4. Each of the zero-gray enhancement values corresponds to one of the grayscale levels. The zero-gray enhancement values control luminance associated with the pixels of the display screen in rendering the images.

At step 506, the images are rendered on the display screen. The images are rendered on the display screen based on the image data and the zero-gray enhancement values.

Figure 6:
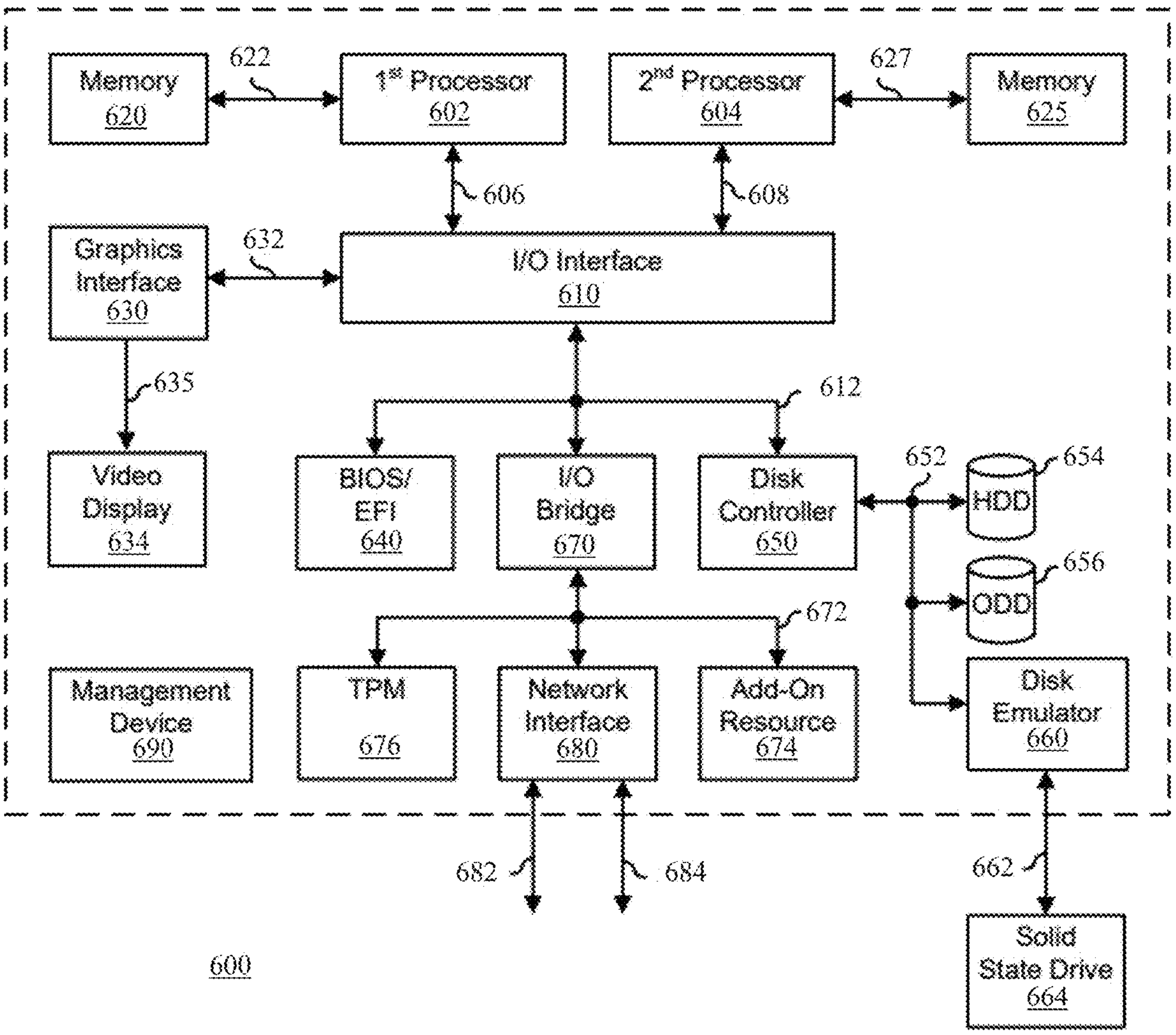
FIG. 6 is a block diagram of a general information handling system according to at least one embodiment of the present disclosure.

FIG. 6 shows a generalized embodiment of an information handling system 600 according to an embodiment of the present disclosure. Information handling system 600 may be utilized with display device 100 of FIG. 1. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described below and operates to perform one or more of the methods described below. Information handling system 600 includes a processors 602 and 604, an input/output (I/O) interface 610, memories 620 and 625, a graphics interface 630, a basic input and output system/universal extensible firmware interface (BIOS/UEFI) module 640, a disk controller 650, a hard disk drive (HDD) 654, an optical disk drive (ODD) 656, a disk emulator 660 connected to an external solid state drive (SSD) 664, an I/O bridge 670, one or more add-on resources 674, a trusted platform module (TPM) 676, a network interface 680, a management device 690, and a power supply 695. Processors 602 and 604, I/O interface 610, memory 620, graphics interface 630, BIOS/UEFI module 640, disk controller 650, HDD 654, ODD 656, disk emulator 660, SSD 664, I/O bridge 670, add-on resources 674, TPM 676, and network interface 680 operate together to provide a host environment of information handling system 600 that operates to provide the data processing functionality of the information handling system. The host environment operates to execute machine-executable code, including platform BIOS/UEFI code, device firmware, operating system code, applications, programs, and the like, to perform the data processing tasks associated with information handling system 600.

In the host environment, processor 602 is connected to I/O interface 610 via processor interface 606, and processor 604 is connected to the I/O interface via processor interface 608. Memory 620 is connected to processor 602 via a memory interface 622. Memory 625 is connected to processor 604 via a memory interface 627. Graphics interface 630 is connected to I/O interface 610 via a graphics interface 632 and provides a video display output 636 to a video display 634. In a particular embodiment, information handling system 600 includes separate memories that are dedicated to each of processors 602 and 604 via separate memory interfaces. An example of memories 620 and 630 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 640, disk controller 650, and I/O bridge 670 are connected to I/O interface 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 610 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 640 includes BIOS/UEFI code operable to detect resources within information handling system 600, to provide drivers for the resources, initialize the resources, and access the resources. BIOS/UEFI module 640 includes code that operates to detect resources within information handling system 600, to provide drivers for the resources, to initialize the resources, and to access the resources.

Disk controller 650 includes a disk interface 652 that connects the disk controller to HDD 654, to ODD 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits SSD 664 to be connected to information handling system 600 via an external interface 662. An example of external interface 662 includes a USB interface, an IEEE 4394 (Firewire) interface, a proprietary interface, or a combination thereof. Alternatively, solid-state drive 664 can be disposed within information handling system 600.

I/O bridge 670 includes a peripheral interface 672 that connects the I/O bridge to add-on resource 674, to TPM 676, and to network interface 680. Peripheral interface 672 can be the same type of interface as I/O channel 612 or can be a different type of interface. As such, I/O bridge 670 extends the capacity of I/O channel 612 when peripheral interface 672 and the I/O channel are of the same type, and the I/O bridge translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as I/O interface 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Management device 690 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 600. In particular, management device 690 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 600, such as system cooling fans and power supplies. Management device 690 can include a network connection to an external management system, and the management device can communicate with the management system to report status information for information handling system 600, to receive BIOS/UEFI or system firmware updates, or to perform other task for managing and controlling the operation of information handling system 600.

Management device 690 can operate off of a separate power plane from the components of the host environment so that the management device receives power to manage information handling system 600 when the information handling system is otherwise shut down. An example of management device 690 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (IDRAC), an Embedded Controller (EC), or the like. Management device 690 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A scalar of a display device of an information handling system, the scalar comprising:

a scalar processor to generate image data from raw image data, including grayscale levels, received from the information handling system, wherein the image data is used by the display device to control pixels of a display screen of the display device to render images on the display screen; and a hardware zero-gray luminance enhancer configured to communicate with the scalar processor, the hardware zero-gray luminance enhancer to add a reflected luminance to a zero-gray luminance to generate zero-gray enhancement values, wherein each zero-gray enhancement value uniquely corresponds to one of the grayscale levels, and wherein the zero-gray enhancement values control luminance associated with the pixels.

2. The scalar of claim 1, wherein the zero-gray enhancement values are based on data received by the scalar from an ambient light sensor that determines ambient luminance impinging on the display screen.

3. The scalar of claim 1, wherein the zero-gray enhancement values are based on a reflectance value.

4. The scalar of claim 1, wherein the zero-gray enhancement values are based on a darkroom contrast ratio associated with the display screen of the display device.

5. The scalar of claim 1, wherein the zero-gray enhancement values change in response to a change in ambient luminance detected by an ambient light sensor.

6. The scalar of claim 1, wherein the hardware zero-gray luminance enhancer further to generate the zero-gray enhancement values by an identification of the grayscale levels on a gamma curve that the hardware zero-gray luminance enhancer selects based on an ambient contrast ratio associated with the display screen of the display device.

7. The scalar of claim 6, wherein the gamma curve is one of a plurality of predetermined gamma curves that each uniquely corresponds to a different ambient contrast ratio associated with the display screen.

8. A display device of an information handling system (IHS), comprising:

a display screen;

an ambient light sensor for detecting ambient light affecting an image rendered on the display screen; and a scalar configured to communicate with the display screen and with the ambient light sensor, wherein the scalar includes:

a scalar processor to generate image data from raw image data, including grayscale levels, received from the information handling system, wherein the image data is used by the display device to control pixels of the display screen of the display device in rendering images on the display screen; and a hardware zero-gray luminance enhancer configured to communicate with the scalar processor, the hardware zero-gray luminance enhancer to add a reflected luminance to a zero-gray luminance to generate zero-gray enhancement values, wherein each zero-gray enhancement value uniquely corresponds to one of the grayscale levels, and wherein the zero-gray enhancement values control luminance associated with the pixels.

9. The display device of claim 8, wherein the zero-gray enhancement values are based on data received by the scalar from the ambient light sensor that determines ambient luminance impinging on the display screen.

10. The display device of claim 8, wherein the zero-gray enhancement values are based on a reflectance value.

11. The display device of claim 8, wherein the zero-gray enhancement values are based on a darkroom contrast ratio associated with the display screen of the display device.

12. The display device of claim 8, wherein the zero-gray enhancement values change in response to a change in ambient luminance detected by the ambient light sensor.

13. The display device of claim 8, wherein the hardware zero-gray luminance enhancer further to generate the zero-gray enhancement values by an identification of the grayscale levels on a gamma curve that the hardware zero-gray luminance enhancer selects based on an ambient contrast ratio associated with the display screen of the display device.

14. The display device of claim 13, wherein the gamma curve is one of a plurality of predetermined gamma curves that each uniquely corresponds to a different ambient contrast ratio associated with the display screen.

15. A method of rendering zero-gray enhanced images, the method comprising:

generating image data by processing raw image data, including grayscale levels, received from an information handling system, wherein the image data is used to control pixels of a display screen of a display device of the information handling system in rendering images on the display screen;

adding a reflected luminance to a zero-gray luminance;

based on the adding of the reflected luminance to the zero-gray luminance, generating zero-gray enhancement values, wherein each zero-gray enhancement value uniquely corresponds to one of the grayscale levels, and wherein the zero-gray enhancement values control luminance associated with the pixels; and rendering images on the display screen based on the image data and the zero-gray enhancement values.

16. The method of claim 15, wherein the zero-gray enhancement values are based on data received by a scalar from an ambient light sensor that determines ambient luminance impinging the display screen.

17. The method of claim 15, wherein the zero-gray enhancement values are based on a reflectance value.

18. The method of claim 15, wherein the zero-gray enhancement values are based on a darkroom contrast ratio associated with the display screen of the display device.

19. The method of claim 15, wherein the zero-gray enhancement values change in response to a change in ambient luminance detected by an ambient light sensor.

20. The method of claim 15, wherein the generating zero-gray enhancement values includes identifying values on a gamma curve selected based on an ambient contrast ratio associated with the display screen of the display device.

* * * * *